US007941747B2

(12) United States Patent
Jawaharlal et al.

(10) Patent No.: US 7,941,747 B2
(45) Date of Patent: May 10, 2011

(54) AUTOMATED GENERATION OF OLTP MESSAGE SOURCE CODE

(75) Inventors: Sridhar Jawaharlal, Warwick, RI (US); Arne Vajhoej, Kirke Saaby (DK)

(73) Assignee: Gtech Rhode Island Corporation

( * ) Notice: Subject to any disclaimer, the term of this patent is extended or adjusted under 35 U.S.C. 154(b) by 1345 days.

(21) Appl. No.: 10/681,057

(22) Filed: Oct. 7, 2003

(65) Prior Publication Data

US 2005/0076332 A1    Apr. 7, 2005

(51) Int. Cl.
G06F 17/00    (2006.01)
G06F 15/16    (2006.01)
(52) U.S. Cl. .................. 715/236; 715/239; 709/217
(58) Field of Classification Search .................. None
See application file for complete search history.

(56) References Cited

U.S. PATENT DOCUMENTS

| | | | | |
|---|---|---|---|---|
| 6,003,013 | A * | 12/1999 | Boushy et al. | 705/10 |
| 2002/0122054 | A1 * | 9/2002 | Hind et al. | 345/731 |
| 2002/0178299 | A1 * | 11/2002 | Teubner | 709/320 |
| 2003/0084405 | A1 * | 5/2003 | Ito et al. | 715/513 |
| 2003/0167444 | A1 * | 9/2003 | Zorc | 715/513 |
| 2004/0168124 | A1 * | 8/2004 | Beisiegel et al. | 715/513 |
| 2005/0044197 | A1 * | 2/2005 | Lai | 709/223 |

OTHER PUBLICATIONS

Abdelkhalek et al, Behavior and Performance of Interactive Multiplayer Game Servers, 2001, IEEE, pp. 137-146.*
Michael Koch, "Leverage legacy systems with a blend of XML, XSL, and Java", Oct. 6, 2000, JavaWorld.com, pp. 1-6 <http://www.javaworld.com/javaworld/jw-10-2000/jw-1006-legacy.html>.*
Robin Cover, "Apache Xalan XSLT Compiler (XSLTC) Integrated into the Java Web Services Developer Pack (WSDP)", Aug. 26, 2002, xml.coverpages.org, pp. 1-3 <http://xml.coverpages.org/ni2002-08-26-a.html>.*
International Search Report, Appln. No. PCT/US2004/033418, dated Feb. 23, 2005.
Schmidt et al., "Erfahrungen mit VDM bei der Übersetzungskonstruktion. Experiences with VDM in Compiler Construction", Informationstechnik IT, 29(4): 211-216, 1987.

* cited by examiner

*Primary Examiner* — Michael J Yigdall
*Assistant Examiner* — Ben C Wang
(74) *Attorney, Agent, or Firm* — Sullivan & Worcester LLP; Christopher T. McWhinney

(57) ABSTRACT

Systems, architectures and methods of processing messages provide for automatic generation of source code in a program language. The source code is compiled and used to transform messages between the program language and an online transaction processing (OLTP) language. In one approach, markup language documents are compiled.

49 Claims, 3 Drawing Sheets

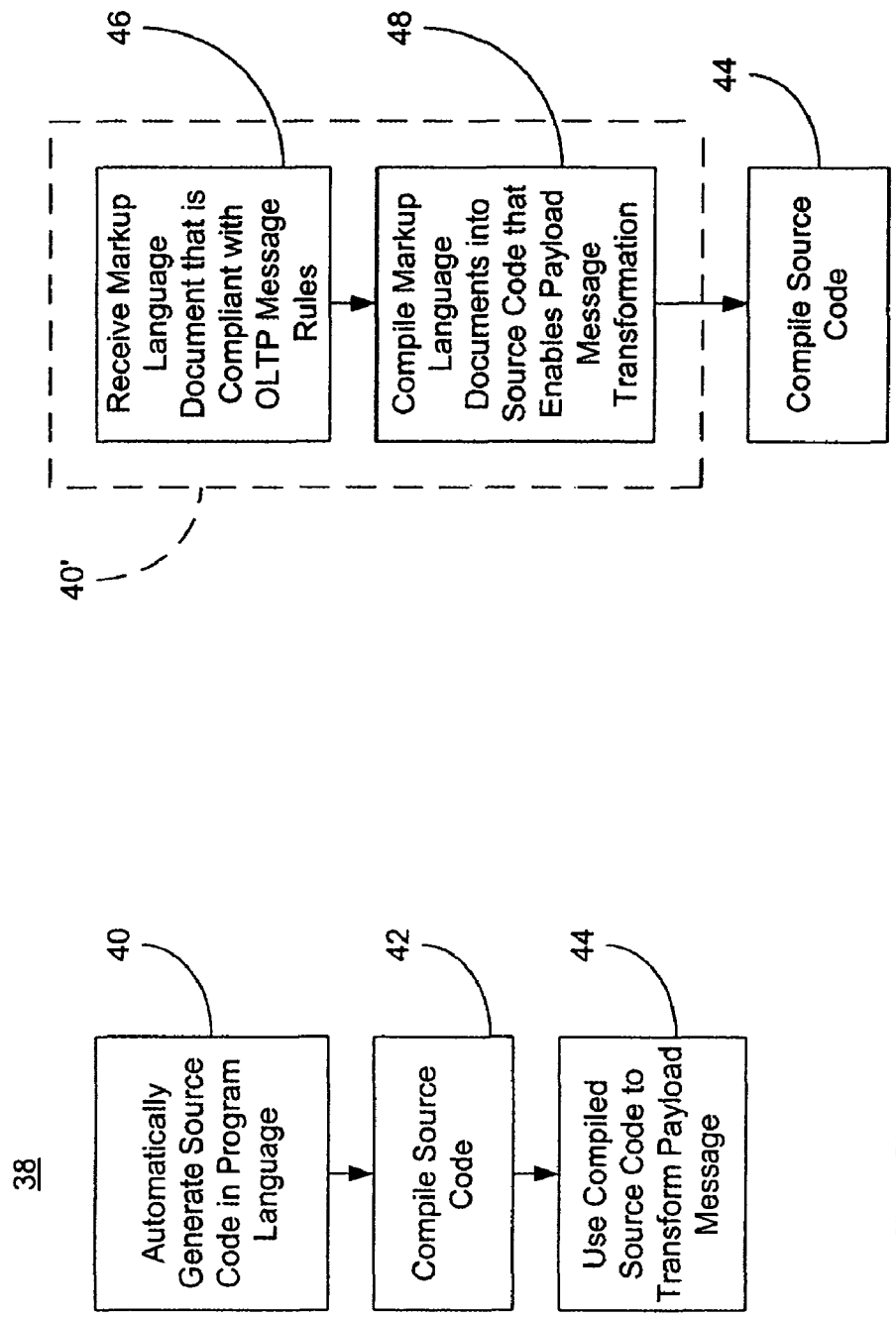

AUTOMATED GENERATION OF OLTP MESSAGE SOURCE CODE

BACKGROUND

1. Technical Field

Embodiments of the invention generally relate to online transaction processing (OLTP) messages. More particularly, embodiments relate to the automated generation of source code for transforming payload messages into and out of an OLTP language.

2. Discussion

Gaming systems are in widespread use and continue to grow in popularity. For example, the use of point-of-sale terminals has expanded from traditional retail environments to a wide variety of non-traditional environments. Indeed, in some markets consumers can purchase lottery tickets online from the comfort of their own home or from a filling station pump while purchasing gas.

A typical gaming system includes an application running at the location of the consumer, where the application is networked with a remote online transaction processing (OLTP) host. The OLTP host is responsible for managing the particular game being played and often operates under a proprietary, industry specific language. For example, one gaming system, which is commercially available from the GTech Rhode Island Corporation, implements an OLTP language that defines a specific and unique message structure that results in relatively dense byte arrays. The application, on the other hand, is typically a web-based program written in an objected-oriented program language, such as the Java language, that is incompatible with the OLTP language. Thus, in order for the application and the OLTP host to communicate with one another, messages between the application and the OLTP host must be transformed between the program language of the application and the OLTP language. Specialized source code is used to perform the message translation, where the source code is developed offline based on the protocols of the two languages. Once the message translation source code has been developed, it is used to process messages in real-time. There is therefore an offline process in which the code is developed, and an online process in which the code is used to transform messages in real-time.

Conventionally, the source code development process begins when human programmers having knowledge of both the program language and the OLTP language manually write source code for each type of message to be encountered. For example, a message from the application to the OLTP host requesting an online lottery wager might be defined as the message type "LottoWagerRequest", whereas a message from the OLTP host responding to such a message might be defined as "WagerResponse". Thus, the programmers would generate a LottoWagerRequest source code file and a WagerResponse source code file, where the LottoWagerRequest file is able to transform messages from the program language of the application to the OLTP language and the WagerResponse file is able to transform messages from the OLTP language to the program language. Once the source code for a given type of message has been written, a program compiler compiles the source code into an executable format.

The online process begins when a message parser receives a message in either the program language or the OLTP language and uses the compiled source code to transform the message between the program language and the OLTP language. For example, the above-described LottoWagerRequest message from the application to the host would be transformed from the program language to the OLTP language (i.e., encoded). On the other hand, the WagerResponse message from the OLTP host to the application would be transformed from the OLTP message to the program language (i.e., decoded).

Unfortunately, the manual labor associated with writing the source code for all of the possible message types typically takes months and therefore can have a significant effect on the development process. There is therefore a need to reduce the amount of time, labor and expense required to generate source code that is used to transform messages between a program language and an OLTP language.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a flowchart of an example of a method of processing messages according to one embodiment of the invention; and FIG. 4 is a flowchart of an example of a method of generating source code according to one embodiment of the invention.

DETAILED DESCRIPTION

Systems, architectures and methods of processing messages provide for a significant reduction in the amount of time, labor and expense required in the development stages of a message transformation process. In one embodiment, a method of processing messages involves generating source code in a program language. The source code is compiled and the compiled source code is used to transform a payload message the program language and an online transaction processing (OLTP) language. The source code is generated automatically.

In another embodiment, a method of generating source code involves receiving a markup language document, where the markup language document is compliant with message rules associated with an OLTP language. The markup language document is compiled into source code, where the source code enables transformation of a payload message between a program language and the OLTP language.

In yet another embodiment, a message processing architecture includes a development module, a program compiler and a message parser. The development module generates source code in a program language and the program compiler compiles the source code. The message parser transforms a payload message between the program language and an OLTP language, where the development module generates the source code automatically.

Figure 1:
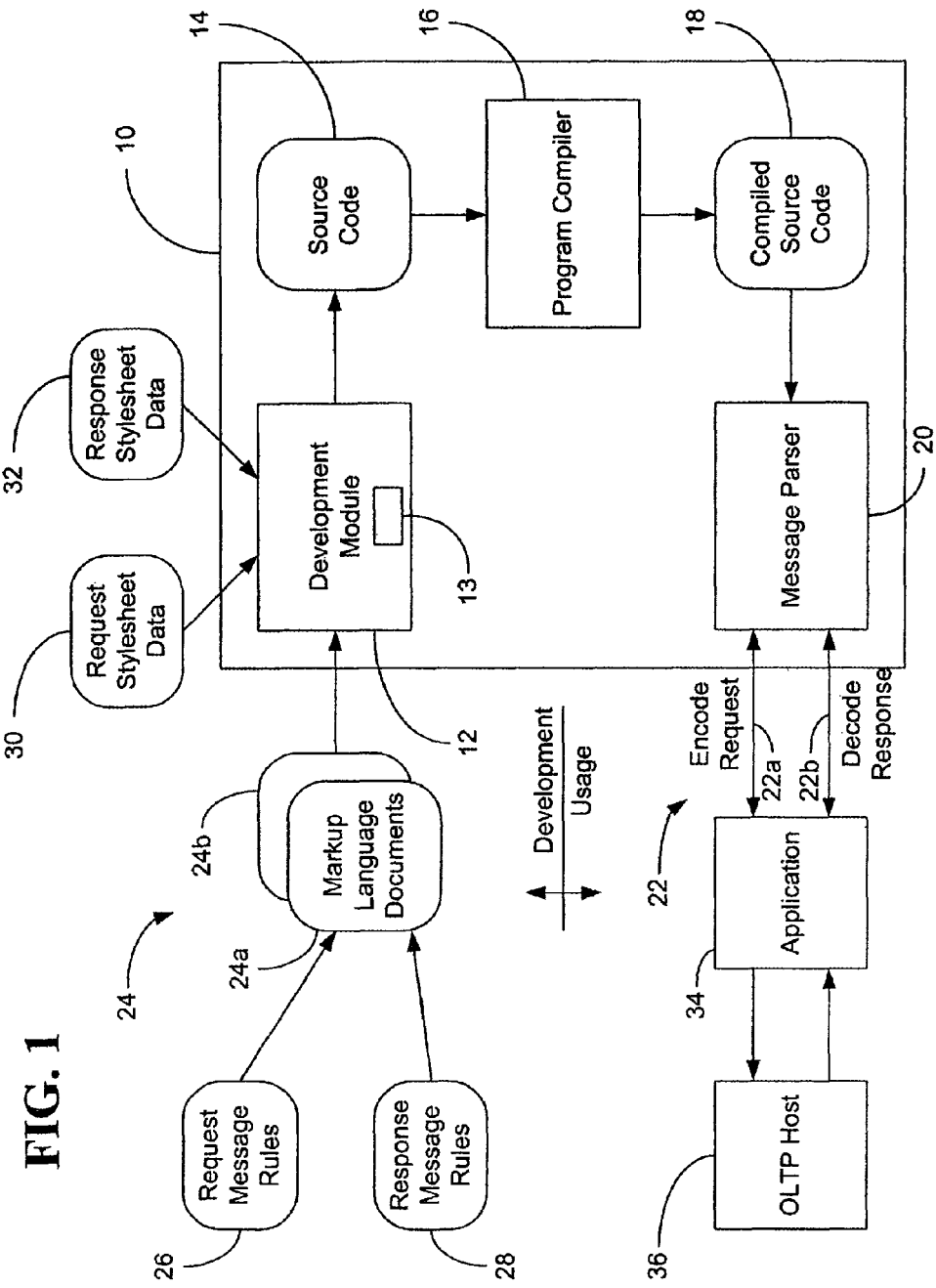
FIG. 1 is a block diagram of an example of a message processing architecture according to one embodiment of the invention.

FIG. 1 shows a message processing architecture 10 that provides for a significant reduction in the amount of time and effort required in transforming messages between a program language and an OLTP language. While the message processing architecture 10 will be primarily described with regard to payload messages of a gaming system, the embodiments are not so limited. Indeed, any system in which OLTP development time is an issue of concern can benefit from the principles described herein. Notwithstanding, there are a number of aspects of gaming system payload messages for which the message processing architecture 10 is well suited. For example, payload messages, which implement actual transactions between the application and the OLTP host, contribute significantly to the development time associated with a given system.

Generally, message processing architecture 10 assists an application 34 in communicating with an OLTP host 36 so that application 34 and OLTP host 36 are able to communicate seamlessly and in real-time. The OLTP host 36 is typically a proprietary system that operates under an industry specific OLTP language. The application 34, on the other hand, can be a commercially available web-based program written in program language such as an object-oriented program language. In one example, the OLTP host 36 is a gaming system such as an online wagering system and the application 34 is a middleware program that performs various player data management operations. Since the language of the OLTP host 36 is generally incompatible with the language of the application 34, architecture 10 is needed.

The illustrated message processing architecture 10 has a development module 12 that generates source code 14 in the program language of the application 34. A program compiler 16 compiles the source code 14 such that compiled source code 18 results. A message parser 20 transforms payload messages 22 (22a, 22b) between the program language and the OLTP language. Specifically, message parser 20 transforms request messages 22a from the program language to the OLTP language (i.e., encodes) and transforms response messages 22b from the OLTP language to the program language (i.e., decodes). Since the development module 12 generates the source code 14 automatically, it has been determined that in certain environments source code 14 can be generated for all message types in a matter of weeks, where the same task takes months in conventional approaches.

Specifically, the development module 12 receives a markup language document 24 (24a, 24b) for each message in the OLTP language and compiles the markup documents 24 into the source code 14. Thus, source code 14 is generated for a plurality of message types. In the context of a gaming system, a type of request message could be a message requesting to place an online lottery wager, and a type of response message could be a message responding to a wager request.

The markup language documents 24 are compliant with message rules 26, 28, where the message rules 26, 28 are associated generally with the OLTP language, and the source code 14 enables transformation of messages 22 between the program language and the OLTP language. In particular, the message rules 26, 28 define markup tags for describing components of the messages 22. For example, request message rules 26 might describe elements such as "encrypt", "checksum" and "length", as well as the attributes that can be used to define these elements in a markup language document. Similarly, response message rules 28 might define elements such as "decrypt" and "map", and the appropriate attribute rules. The markup language documents 24 can be generated by someone knowledgeable of the markup language in question.

The development module 12 can further include a stylesheet parser 13, where the development module 12 uses the stylesheet parser 13 to compile the markup language documents 24 based on stylesheet data 30, 32. The stylesheet data 30, 32 represent program templates for each type of message in the program language. As already discussed, the source code 14 behaves differently depending on whether the message is a request message 22a that must be encoded or a response message 22b that must be decoded. Accordingly, the stylesheet data is partitioned into request stylesheet data 30 and response stylesheet data 32.

It should be noted that the components of the architecture 10 may be located together, apart, or any combination thereof. For example, the development module 12 may be deployed at the location of the OLTP host, where the source code 14 is distributed to individuals and entities associated with application 34. In such a case, the application 34, message parser 20 and program compiler 16 may all be running on the same system. Alternatively, all of the components of the architecture 10 might be deployed at the OLTP host location, where the request and response messages 22 are sent to the message parser 20 over a network connection. The above examples are not all inclusive and are given merely to facilitate an understanding of the principles described herein.

Figure 2:
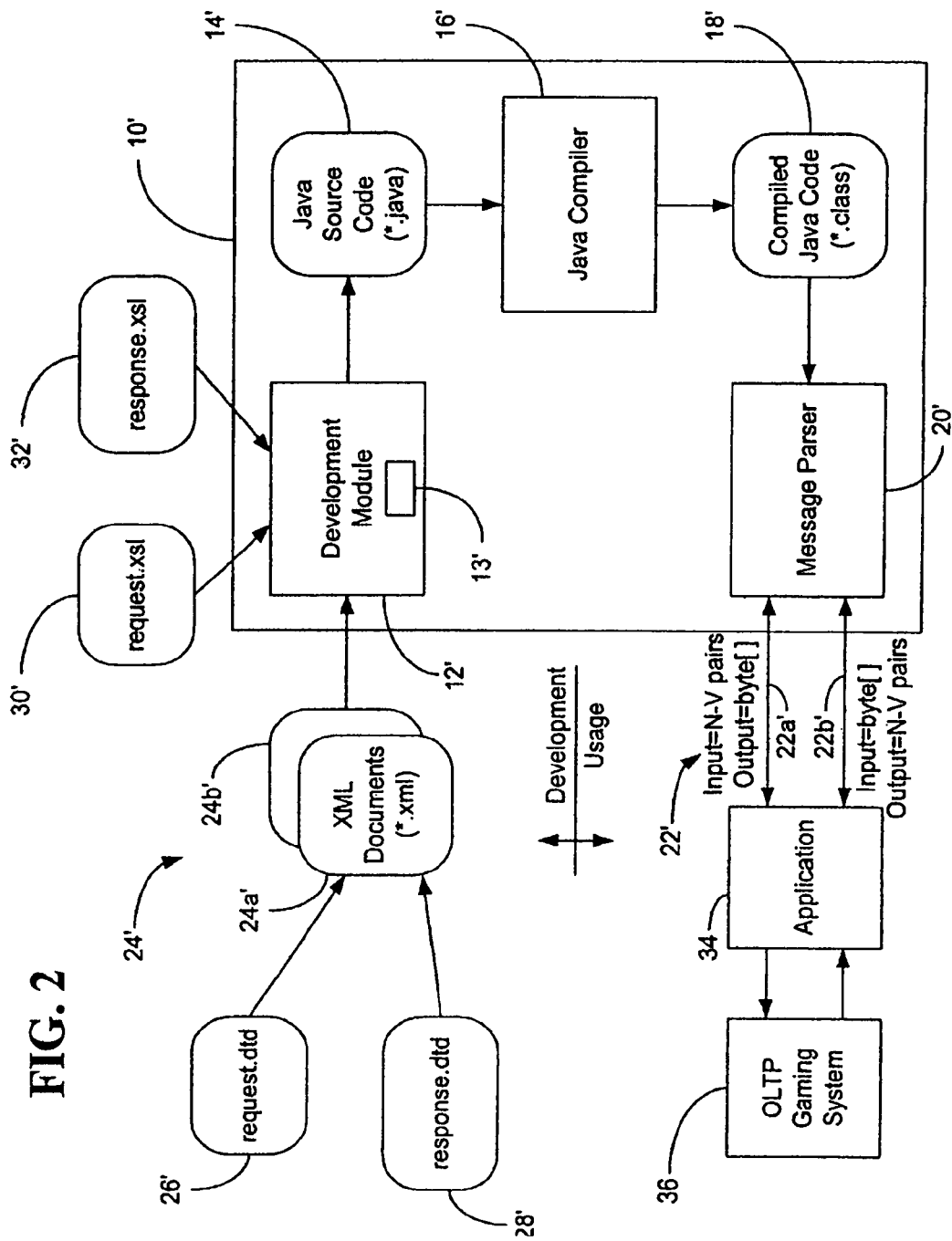
FIG. 2 is a block diagram of an example of a message processing architecture according to an alternative embodiment of the invention.

Turning now to FIG. 2, a particular example of a message processing system 10' is shown in which the program language is Java (Java 2 Platform, Enterprise Edition/J2EE; Java 2 Platform, Standard Edition/J2SE). Other object-oriented languages such as C++ (C++ 2.1, Stroustramp et al., 1990) and Smalltalk (ANSI INCITS 319-1998, 2002) would have similar implementations. In the case of an object-oriented language such as Java, the compiled source code is a class file that generates either a byte array containing the encoded message, or a hash map that contains the decoded message. Generally, a hash map contains name-value pairs that are stored in a common data structure, where the data structure offers quick insertion and search capabilities. Thus, when an application needs to send a request message to the OLTP host (i.e., encode a message), the application sends a hash map containing the appropriate name-value pairs to the message parser, which loads and executes the corresponding class file based on the type of message. The class file generates a byte array that complies with the OLTP language and the message parser returns the byte array to the application.

When the application needs to read or process a response message from the OLTP host (i.e. decode a message), the application sends a byte array representing the response message to the message parser. The message parser parses the byte array, then loads and executes the appropriate class file based on the type of message. The class file generates a Java hash map that complies with the application program language.

In the illustrated example, development module 12' uses stylesheet parser 13' such as the commercially available XSLT parser to generate source code 14' in Java for a particular type of message. Java source code 14' is a *.java file. A Java compiler 16' such as the compiler in the commercially available Java Development Kit (JDK) compiles the Java source code 14' to obtain compiled Java code 18'. The compiled Java code 18' is a *.class file and is used by message parser 20' to transform messages 22' between Java and the OLTP language.

As already discussed, when application 34 needs to send a request message 22a' to the OLTP host (i.e., encode a message), the application 34 sends a hash map containing the appropriate name-value pairs to the message parser 20', which loads and executes the corresponding class file 18'. The class file 18' generates a byte array that complies with the OLTP language and the message parser 20' returns the byte array to the application. When the application needs to read or process a response message 22b' from the OLTP host 36 (i.e. decode a message), the application 34 sends a byte array representing the response message 22b' to the message parser 20'. The message parser 20' parses the byte array, then loads and executes the appropriate class file 18'. The class file 18' generates a Java hash map that complies with the application program language.

Development module 12' generates the Java source code 14' automatically, based on markup language documents 24' (24a', 24b') and stylesheet data 30', 32', where the markup language documents 24' are extensible markup language (XML, 1.0 World Wide Web Consortium/W3C Recommendation, Feb. 10, 1998) documents, and are compliant with message rules 26', 28'. Automatic generation of the source code 14' significantly reduces the amount of time, labor and expense associated with the development of the overall system.

Turning now to FIG. 3, a method 38 of processing messages is shown. Method 38 can be implemented using any combination of commercially available software and/or hardware techniques. For example, method 38 can be implemented as a set of instructions stored in a machine-readable medium such as read only memory (ROM), compact disk ROM (CD-ROM), electrically erasable programmable ROM (EEPROM), random access memory (RAM), etc. as a message processing architecture. Specifically, processing block 40 provides for automatically generating source code in a program language. The source code is compiled at block 42 and the compiled source code is used to transform a message between the program language and an OLTP language at block 44.

FIG. 4 shows one approach to generating source code in greater detail at block 40'. Processing block 40' can also be implemented as a set of instructions stored in a machine-readable medium, where the instructions are capable of being executed by a processor to generate source code. Specifically, processing block 46 provides for receiving a markup language document where the markup language document is compliant with message rules associated with the OLTP language. The markup language document is compiled into the source code at block 48. The source code enables transformation of the message between the program language and the OLTP language.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of processing online transaction messages between a client application and an online transaction processing (OLTP) application server comprising:
   receiving a markup language document describing a message, the markup language document being compliant with message rules associated with an OLTP language;
   receiving a template for code in a program language, the template describing a data format for the message in a target program language;
   automatically generating source code in the program language from the markup language document and the template, the automatically-generated source code depending on both the markup language document and the template, and configured to transform a payload message directly between the target program language data format and an OLTP language message format when compiled and executed, wherein the target program language data format is based on an object-oriented program language and the OLTP language message format is a byte array;
   compiling the automatically-generated source code;
   a message parser stored on the application server using the compiled automatically-generated source code to transform the payload message directly between the target program language data format and the OLTP language message format.

2. The method of claim 1, wherein the message rules define markup tags for describing components of the message.

3. The method of claim 2, wherein the message is a request message from an application to an OLTP host.

4. The method of claim 2, wherein the message is a response message from an OLTP host to an application.

5. The method of claim 2, wherein the markup language is an extensible markup language.

6. The method of claim 1, wherein the template comprises stylesheet data.

7. The method of claim 6, further including using a stylesheet parser to automatically generate the source code.

8. The method of claim 1, further including receiving a plurality of markup language documents for a plurality of message types and generating source code to convert messages of the plurality of message types between the OLTP language and the target language.

9. The method of claim 1, wherein the target language is an object-oriented program language.

10. The method of claim 9, further including:
    receiving one or more name-value pairs for the message according to the object-oriented program language;
    generating a byte array according to the OLTP language; and
    transmitting the byte array to an application.

11. The method of claim 9, further including:
    receiving a byte array for the message according to the OLTP language; generating one or more name-value pairs according to the object-oriented program language; and
    transmitting the name-value pairs to an application.

12. The method of claim 9, wherein the object-oriented program language is a Java language.

13. The method of claim 1, wherein the OLTP language is a gaming system language.

14. The method of claim 1, further comprising:
    providing an online gaming system by an OTLP host which uses the OLTP language, wherein the online gaming system processes wagering-related transactions; and
    providing an application at a consumer location which uses the target program language, wherein the application provides access to the wagering-related transactions for the consumer,
    wherein the payload message is part of at least one of the wagering-related transactions and comprises at least one of: a request to place an online wager, or a response to the request to place the online wager.

15. The method of claim 1, wherein the program language is the target program language.

16. The method of claim 1, wherein the automatically-generated source code is further configured to transform the first payload message directly from the target program language data format to the online transaction processing (OLTP) language message format, and to transform a second payload message directly from the OLTP language message format to the target program language data format.

17. A method of generating source code for processing online transaction messages between a client application and an online transaction processing (OLTP) application server, comprising:
receiving a markup language document, the markup language document being compliant with message rules associated with an OLTP language;
receiving a template for code in a program language, the template describing a data format in a target program language for a message; and
automatically generating a source code based on the markup language document and the template, the source code depending on both the markup language document and the template, and enabling transformation of a payload message directly between the target program language data format and an OLTP language message format, wherein the target program language data format is based on an object-oriented program language and the OLTP language message format is a byte array.

18. The method of claim 17, wherein the message rules define markup tags for describing components of the message.

19. The method of claim 18, wherein the message is a request message from an application to an OLTP host.

20. The method of claim 18, wherein the message is a response message from an OLTP host to an application.

21. The method of claim 18, wherein the markup language is an extensible markup language.

22. The method of claim 17, wherein the template comprises stylesheet data.

23. The method of claim 22, further including using a stylesheet parser to automatically generate the source.

24. The method of claim 17, further including receiving a plurality of markup language documents for a plurality of message types and generating source code to convert the plurality of message types between the OLTP language and the target language.

25. The method of claim 17, further comprising:
providing an online gaming system by an OTLP host which uses the OLTP language, wherein the online gaming system processes wagering-related transactions; and
providing an application at a consumer location which uses the target program language, wherein the application provides access to the wagering- related transactions for the consumer,
wherein the payload message is part of at least one of the wagering- related transactions and comprises at least one of: a request to place an online wager, or a response to the request to place the online wager.

26. The method of claim 17, wherein the program language is the target program language.

27. The method of claim 17, wherein the source code is further configured to enable transformation of the payload message directly from the target program language data format to the OLTP language message format, and to enable transformation of a second payload message directly from the OLTP language message format to the target program language data format.

28. A method of processing online transaction messages between a client application and an online transaction processing (OLTP) application server comprising:
receiving one or more extensible markup language (XML) documents, the XML documents being compliant with message rules associated with an OLTP language, the OLTP language being a gaming system language and the message rules defining markup tags for describing components of a message;
automatically compiling the XML documents and generating source code in an object-oriented program language based on the XML documents and stylesheet data, the stylesheet describing a data format for the message in a target program language, the source code configured, when compiled and executed, to transform a message directly between the target program language data format and an OLTP language message format, wherein the target program language data format is based on an object-oriented program language and the OLTP language message format is a byte array;
compiling the source code;
a message parser stored on the application server using the compiled source code to transform a payload message directly between the target language data format and the OLTP language message format; and
repeating the receiving and compiling of XML documents and the compiling of source code for a plurality of message types.

29. The method of claim 28, further including using a stylesheet parser to compile the XML documents.

30. The method of claim 28, further including: receiving one or more name-value pairs for the message according to the program language; generating a byte array according to the OLTP language; and transmitting the byte array to an application.

31. The method of claim 28, further including: receiving a byte array for the message according to the OLTP language; generating one or more name-value pairs according to the program language; and transmitting the name-value pairs to an application.

32. The method of claim 28, wherein the object-oriented program language is a Java language.

33. The method of claim 28, further comprising:
providing an online gaming system by an OTLP host which uses the OLTP language, wherein the online gaming system processes wagering-related transactions; and
providing an application at a consumer location which uses the target program language, wherein the application provides access to the wagering- related transactions for the consumer,
wherein the payload message is part of at least one of the wagering- related transactions and comprises at least one of: a request to place an online wager, or a response to the request to place the online wager.

34. The method of claim 23, wherein the program language is the target program language.

35. The method of claim 34, further comprising:
using a stylesheet parser to compile the XML documents;
receiving one or more name-value pairs for the message according to the program language; generating a byte array according to the OLTP language; and transmitting the byte array to an application;
receiving a byte array for the message according to the OLTP language; generating one or more name-value pairs according to the program language; and transmitting the name-value pairs to an application; and
wherein the object-oriented program language is a Java language.

36. The method of claim 28, wherein the source code is further configured, when compiled and executed, to transform the message directly from the target program language data format to the OLTP language message format, and to transform a second message directly from the OLTP language message format to the target program language data format.

37. An apparatus for processing online transaction messages between a client application and an online transaction processing (OLTP) application server, comprising:
 an application server including a development module stored on the application server, the development module configured to receive a markup language document and a template for code in a program language, the template describing a message data format in a target program language, and configured to automatically generate a source code in the program language, the source code depending on both the markup language document and the template, the markup language document to be compliant with message rules associated with an OLTP language, and the source code configured to enable direct transformation of a message between the target program language message data format and an OLTP language message format, wherein the target program language data format is based on an object-oriented program language and the OLTP language message format is a byte array;
 a program compiler configured to compile the source code; and
 a message parser stored on the application server, the message parser configured to transform a payload message directly between the target program language message data format and the OLTP language message format using the compiled source code.

38. The system of claim 37, wherein the message rules define markup tags for describing components of the message.

39. The system of claim 37, wherein the development module further includes a stylesheet parser, the development module to use the stylesheet parser to automatically generate the source code based on stylesheet data.

40. The method of claim 37, further comprising:
 providing an online gaming system by an OTLP host which uses the OLTP language, wherein the online gaming system processes wagering-related transactions; and
 providing an application at a consumer location which uses the target program language, wherein the application provides access to the wagering-related transactions for the consumer,
 wherein the payload message is part of at least one of the wagering-related transactions and comprises at least one of: a request to place an online wager, or a response to the request to place the online wager.

41. The apparatus of claim 37, wherein the program language is the target program language.

42. The apparatus of claim 37, wherein the source code is further configured to enable direct transformation of the message from the target program language message data format to the OLTP language message format, and to enable direct transformation of a second message from the OLTP language message format to the target program language message data format.

43. A machine readable medium comprising a set of stored instructions capable of being executed by a processor to perform a method comprising the steps of:
 receiving a markup language document, the markup language document being compliant with message rules associated with an online transaction processing (OLTP) language;
 receiving a template for code in a program language, the template describing a data format in a target program language relating to a message; and
 automatically generating a source code based on the markup language document and the template, the source code depending on both the markup language document and the template, and configured to transform a payload message directly between the target program language data format and an OLTP language message format when the source code is compiled and executed, wherein the target program language data format is based on an object-oriented program language and the OLTP language message format is a byte array.

44. The medium of claim 43, wherein the message rules define markup tags for describing components of the message.

45. The medium of claim 43, wherein the template comprises stylesheet data.

46. The medium of claim 43, wherein the instructions are further capable of being executed to receive a plurality of markup language documents for a plurality of message types and to generate source code for converting the plurality of message types between the OLTP language message format and the target language message format.

47. The machine readable medium of claim 43, wherein the set of stored instructions is capable of being executed by the processor to further:
 provide an online gaming system by an OTLP host which uses the OLTP language, wherein the online gaming system processes wagering-related transactions; and
 provide an application at a consumer location which uses the target program language, wherein the application provides access to the wagering-related transactions for the consumer,
 wherein the payload message is part of at least one of the wagering-related transactions and comprises at least one of: a request to place an online wager, or a response to the request to place the online wager.

48. The machine readable medium of claim 43, wherein the program language is the target program language.

49. The machine readable medium of claim 43, wherein the source code is further configured to transform the payload message directly from the target program language data format to the OLTP language message format, and to transform a second payload message directly from the OLTP language message format to the target program language data format.

\* \* \* \* \*